United States Patent [19]

Gonze

[11] Patent Number: 4,782,699
[45] Date of Patent: Nov. 8, 1988

[54] PULSED FUEL LEVEL INDICATING SYSTEM

[75] Inventor: Eugene V. Gonze, Madison Heights, Mich.

[73] Assignee: General Motors Corporation, Detroit, Mich.

[21] Appl. No.: 931,771

[22] Filed: Nov. 17, 1986

[51] Int. Cl.$^4$ ............................................. G01F 23/36
[52] U.S. Cl. ........................................ 73/308; 73/313; 340/620
[58] Field of Search ...................... 73/308, 313, 317; 340/509, 512, 526, 620, 623-625; 324/65 R; 377/199

[56] References Cited

U.S. PATENT DOCUMENTS

| | | | |
|---|---|---|---|
| 3,407,398 | 10/1968 | Stearn | 340/244 |
| 4,165,509 | 8/1979 | Betts et al. | 340/620 |
| 4,250,750 | 2/1981 | Martinec et al. | 73/308 |
| 4,326,413 | 4/1982 | Takeshita et al. | 73/313 |
| 4,503,383 | 3/1985 | Agar et al. | 324/61 P |
| 4,509,044 | 4/1985 | Yachida | 377/19 |
| 4,525,850 | 6/1985 | Miller | 377/19 |
| 4,532,491 | 7/1985 | Rau et al. | 73/308 |

Primary Examiner—William A. Cuchlinski, Jr.
Assistant Examiner—Patrick R. Scanlon
Attorney, Agent, or Firm—Warren D. Hill

[57] ABSTRACT

To prevent electrochemical corrosion in a conventional float operated variable resistance fuel level detector due to alcohol in the fuel a current pulse is applied to the detector unit once a minute for a period of 1/1000 second. A solid state circuit stores the level reading between pulses and drives the fuel gauge.

1 Claim, 2 Drawing Sheets

PULSED FUEL LEVEL INDICATING SYSTEM

FIELD OF THE INVENTION

This invention relates to fuel level indicating systems and particularly to such a system for use with corrosive fuels such as alcohol mixtures to minimize the corrosive action.

BACKGROUND OF THE INVENTION

It has long been the practice in the motor vehicle industry to measure the level of fuel in a vehicle tank by a float operated variable resistance coupled to a fuel gauge for changing the gage current according to fuel level. This type of fuel measuring system is a mature design and has the advantage of being relatively inexpensive as well as trouble free when used with gasoline or alcohol/gasoline mixtures containing up to about 30% alcohol. The use of higher concentrations of alcohol in the fuel, however, increases the fuel conductivity and causes corrosion due to electrochemical action. The corrosion breaks the connection between the variable resistor and the float contact thereby causing erroneous gauge readings.

SUMMARY OF THE INVENTION

It is therefore an object of the invention to provide a fuel level indicating system incorporating the advantages of the conventional design while overcoming problems due to electrochemical corrosion.

The invention is carried out by a fuel level indicating system having a fuel level sending unit for measuring fuel level when energized to generate a fuel level signal, the sending unit being subject to electrochemical corrosion due to energizing current; means for minimizing the energizing current comprising means for applying a series of spaced current pulses to the sending unit to energize the sending unit and effect fuel level signal pulses whereby the total charge flowing through the sender is limited to a value determined by the pulse duty cycle; and means responsive to each fuel level signal pulse for producing a display drive signal; and a display unit responsive to the display drive signal for displaying the measured fuel level.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

The cause of the electrochemical corrosion of the fuel level sender in the alcohol containing fuels is the energizing current which normally flows in the sender. The sender action depends on varying the resistance of one portion of a voltage divider and utilizing the voltage resulting from current flow through the divider as the fuel level signal. The solution to the corrosion problem is to minimize the average current or the cumulative charge flow through the sender and still maintain a measurable fuel level signal and the ability to drive the fuel level gauge. To that end an interface circuit is provided to supply short current pulses of low duty cycle to the sender and to generate a gauge driver current from the resulting sender voltage pulse.

Figure 1:
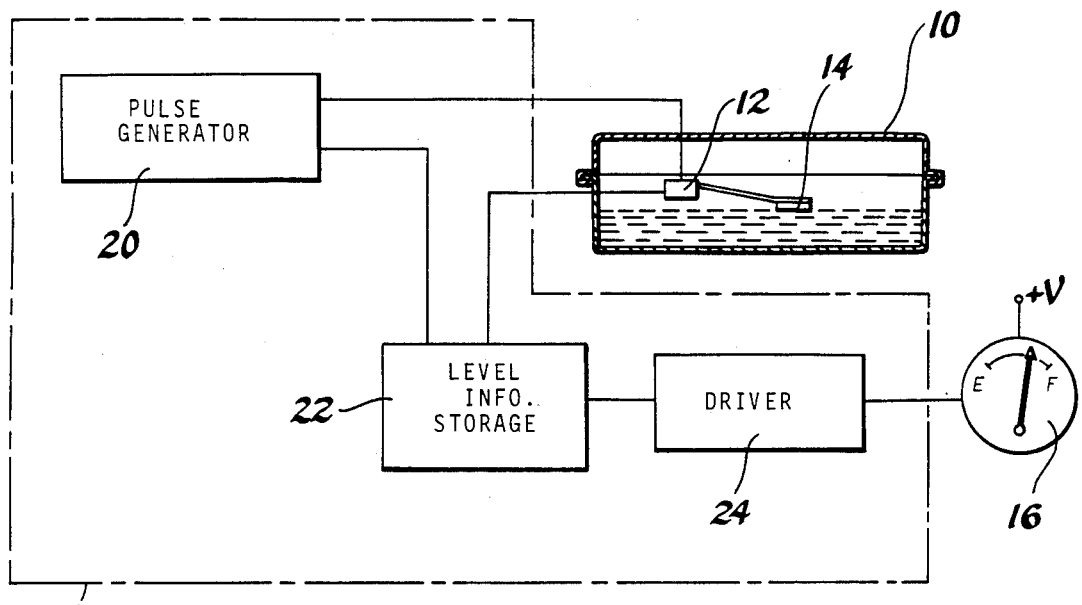
FIG. 1 is a schematic diagram of a fuel level indicating system according to the invention.

Referring to FIG. 1, a fuel tank 10 contains a fuel level sender 12 operated by a float 14 which follows the fuel surface. A fuel gauge 16, preferably of the air core type, responds to an input signal to register the measured fuel level. The input signal is supplied by an interface circuit 18 which energizes the sender 12 and translates the sender output into a driver signal. The interface circuit 18 includes a pulse generator 20 for producing a short low duty cycle pulse for energizing the sender 12, information storage 22 for sensing the fuel level information from the sender at each pulse and storing the information for the period between the pulses, and a driver 24 for continuously supplying current to the fuel gauge 16 at an amplitude determined by the measurement.

Figure 2:
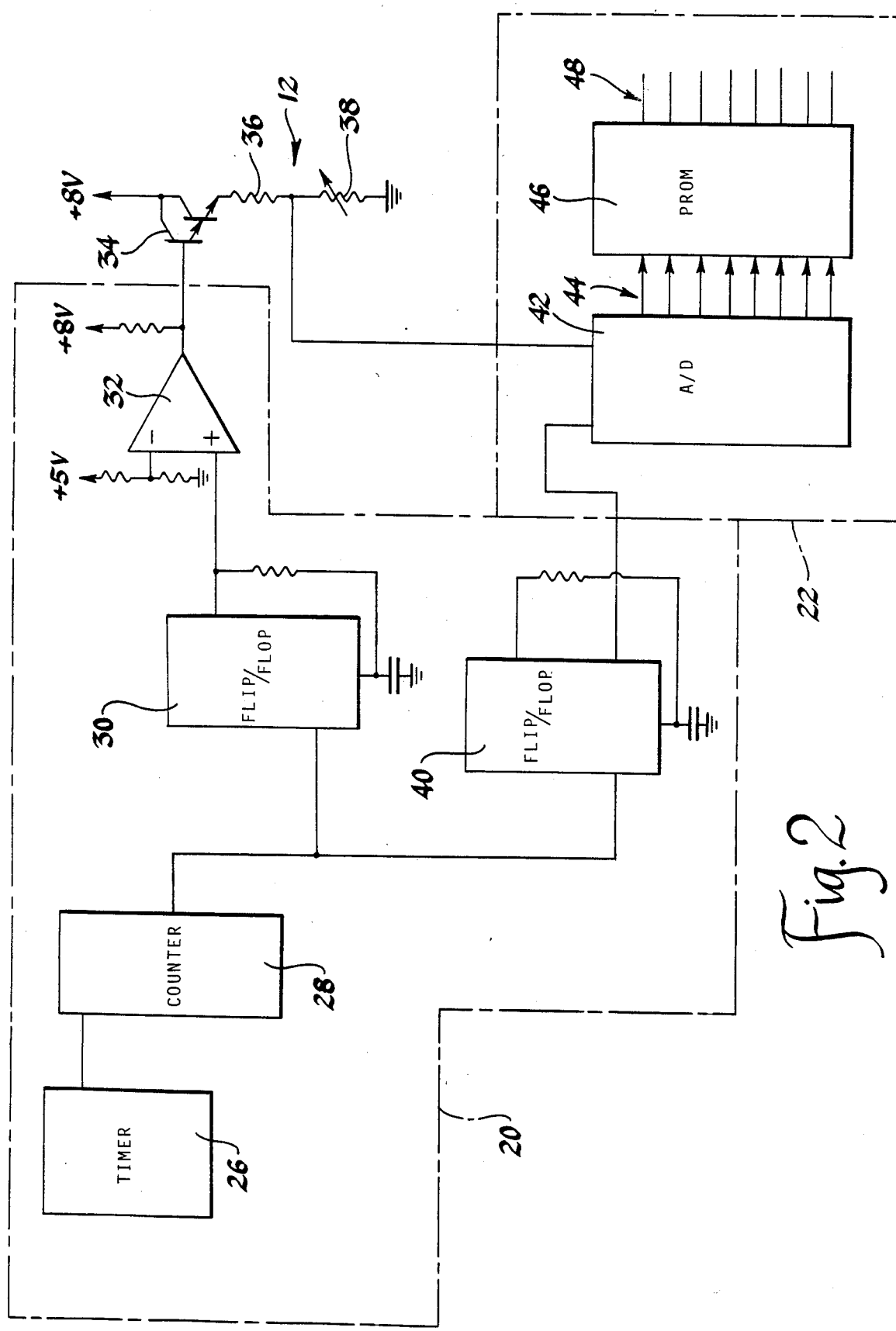
FIG. 2 is a circuit diagram of a digital interface for the system of FIG. 1.

As better shown in FIG. 2, the pulse generator 20 comprises a timer 26 coupled to a counter 28 which together yield one output pulse per minute, although a timer alone could be used for this purpose. A first flip-flop 30 has its clock input connected to the counter 28 output to produce a short pulse, preferably 0.1 msec long. The short pulse is coupled through an amplifier 32 to a Darlington pair 34 serially connected between a power supply and the sender 12 which includes a voltage divider comprising a fixed resistor 36 in series with a float-operated variable resistor 38. The junction of the resistors 36 and 38 is the signal output point of the sender. The amplifier 32 is designed to yield a current pulse of 0.15 amps through the sender 12. The pulse generator 20 also has a second flip-flop 40 which outputs a pulse starting in concert with but terminating sooner than the pulse of the first flip-flop 30 for controlling the next stage.

The information storage circuit 22 comprises an analog to digital converter 42 triggered by the output of flip-flop 40 and responsive to the analog signal from the sender 12 to generate a digital coded signal on an array of output lines 44 which are connected to the address input terminals of a PROM 46. The pulses from the two flip-flops are timed to first establish the voltage divider 12 output and then activate the A/D converter 42 to read that output. The coded signal is stored by the A/D converter 42 until refreshed by a new input. Thus the converter 42 output and the PROM 46 output are sustained throughout the period between pulses and is updated at each pulse. The PROM output is an array of lines 48 which are selectively singly energized as controlled by the converter 42. The lines 48 are coupled to a display driver 24.

Figure 3:
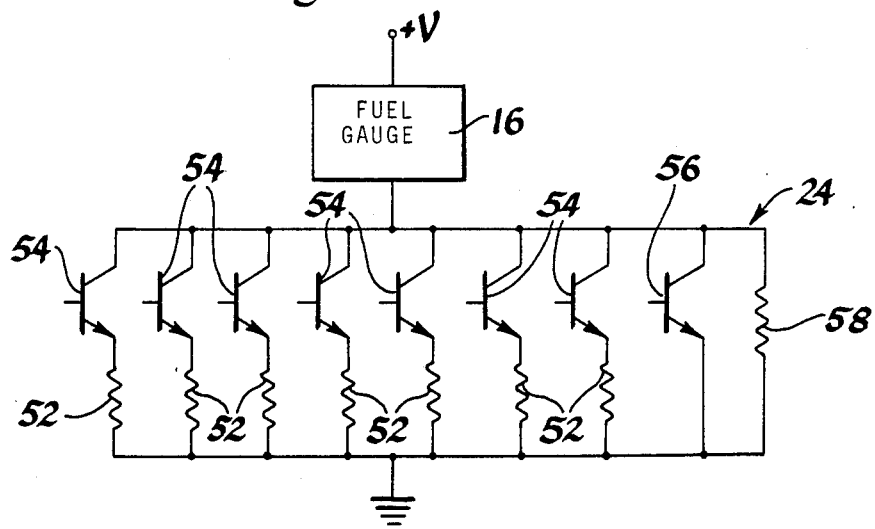
FIG. 3 is a circuit for the gauge driver of FIG. 1.

As shown in FIG. 3, the driver 24 comprises a parallel network of resistors 52 each in series with a transistor 54, all in parallel with a further transistor 56 and a resistor 58. The PROM output lines 48 are connected to the bases of transistors 52, 54 to selectively place the resistors 52 in parallel circuit with resistor 58 thereby controlling the resistance of the network. Each resistor 52 has a unique value so that turning on a given transistor 54 places the corresponding resistor 52 in parallel with resistor 58 to establish a particular network resistance. When the transistor 56 is turned on the resistor 58 is bypassed and the gage is subject to the maximum driving current. The network is in series with the gauge 16 and controls the gauge reading to reflect the fuel level. The PROM determines the transfer function of the system so that the PROM can be programmed to give the correct fuel level reading for any given size and shape fuel tank 10.

The invention is useful with a digital electronic display as well as with the analog gauge 16. In that case the PROM and driver are replaced by the standard digital display circuitry.

It will thus be seen that the present invention reduces or essentially eliminates electrochemical corrosion of a fuel level sender without any change in the sender. The electrochemical action is a result of current flow and the short pulses occurring once per minute reduces the average current by a factor of 600,000 as compared to the conventional dc current used in such fuel level senders. As a result, fuel containing high concentrations of alcohol mixed in gasoline can be used with ordinary fuel levels detectors and conventional gauges as well as with electronic displays.

The embodiments of the invention in which an exclusive property or privilege is claimed are defined as follows:

1. In a fuel level indicating system having a sending unit comprising a variable resistor subject to electrochemical corrosion and a display unit for indicating fuel level, an interface circuit for energizing the sending unit and driving the display unit comprising;

means coupled to the sending unit for generating a series of spaced current pulses having a low "on" duty cycle of the order of 0.1 microsecond and a frequency of occurrence of the order of one current pulse per minute to periodically energize the variable resistor of said sending unit to produce a fuel level output, whereby the electrochemical action on the sending unit is minimized; and means responsive to the sending unit output and coupled to the display unit for generating a display drive signal.

* * * * *